United States Patent [19]

Nagafuchi

[11] Patent Number: 5,619,490
[45] Date of Patent: Apr. 8, 1997

[54] LINE SET-UP SYSTEM

[75] Inventor: Hitoshi Nagafuchi, Tokyo, Japan

[73] Assignee: NEC Corporation, Tokyo, Japan

[21] Appl. No.: 520,646

[22] Filed: Aug. 29, 1995

[30] Foreign Application Priority Data

Sep. 7, 1994 [JP] Japan .................................. 6-213111

[51] Int. Cl.$^6$ ...................................................... H04L 1/16
[52] U.S. Cl. ...................... 370/241; 370/249; 371/20.5
[58] Field of Search .............................. 359/110; 370/13, 370/13.1, 14, 15, 68.1, 110.1; 371/20.5

[56] References Cited

U.S. PATENT DOCUMENTS 5,066,139  11/1991  Soderberg et al. ..................... 371/20.1
5,189,670   2/1993  Inglis ........................................ 370/13

*Primary Examiner*—Melvin Marcelo
*Attorney, Agent, or Firm*—Whitham, Curtis, Whitham & McGinn

[57] ABSTRACT

Line set-up detection circuit 22-1 detects N successive conformities in line information Sa from a network side line terminating set 1 and a signal Sb representing the result of detecting N successive conformities with an error correction code added thereto to the network side line terminating set 1. Network side line set-up control circuit 12 generates a line set-up permission signal Sc or a line set-up inhibition signal Sd on the basis of the signals Sb representing the result of detecting N successive conformities from all user's side line terminating sets 2-1 through 2-3 and transmits it to each of the user's side line terminating sets 2-1 through 2-3. User's side line set-up control circuits 24-1 writes the contents of line set-up primary memory 23-1 into line set-up main memory 25-1 when it receives a line set-up permission signal Sc and inhibits the contents of the line set-up primary memory 23-1 from being written into the line set-up main memory 25-1 when it receives a line set-up inhibition signal Sd.

20 Claims, 2 Drawing Sheets 5,619,490

LINE SET-UP SYSTEM

BACKGROUND OF THE INVENTION

The present invention generally relates to a line set-up system and, more particularly, to a line set-up system adapted for time division multiplex access for a subscriber optical telecommunication line network having an n-branch star configuration.

FIG. 2 of the accompanying drawings schematically illustrates part of a conventional n-branch star configuration where a network side line terminating set 4 is connected to n user's side line terminating sets 5-j (j=1, 2, 3, ..., n) by way of an optical splitter 3. The network side line terminating set 4 comprises a line information transfer circuit 41 and a network side line terminating circuit 42. The line information transfer circuit 41 transfers externally supplied line information Sa such as the phase of transmission and the burst length of transmission burst signals of each user's side line terminating set 5-j to the remaining user's side line terminating sets 5-j by way of the network side line terminating circuit 42.

The network side line terminating circuit 42 terminates n branched optical lines and inserts the line information Sa into the transmission/reception burst signal. On the other hand, each of the user's side line terminating sets 5-j comprises a user's side line terminating circuit 51-j (only 51-1 is shown), a user's side line set-up control circuit 52-j (only 52-1 is shown), a line set-up main memory 53-j (only 53-1 is shown) and a transmission burst control circuit 54-j (only 54-1 is shown).

The user's side line terminating circuits 51-j terminates the related one of the n branched optical lines and executes the extraction of the line information Sa and the line control information from the transmission/reception burst signal and the insertion of the line information detection output signal into the burst signal. The user's side line set-up control circuit 52-j, upon positively acknowledging a normal reception by detecting N successive conformities on the part of the line information from the network side line terminating set 4 or normal detection, transmits a write control signal to the line set-up main memory 53-j, whereas, upon negatively acknowledging a normal reception or abnormal detection, it transmits a stop control signal to the transmission burst control circuit 54-j. The line set-up main memory 53-j stores the line set-up information under the control of the user's side line set-up control circuit 52-j and transfers the stored information to the transmission burst control circuit 54-j. The transmission burst control circuit 54-j controls the phase and the bit length of the transmission burst signal according to the information stored in the line set-up main memory 53-j.

With a subscriber optical telecommunication network having a configuration as described above, if the line set-up information transmitted from the network side line terminating set to a user's side line terminating set is not properly detected due to a bit error occurred on the optical fiber or normal detection is determined, the transmission of burst signals has to be suspended to make the line unusable in order to prevent any interference of burst signals transmitted from other normal user's side line terminating sets by the burst signal transmitted on the basis of the not-properly-detected information.

While this problem may partly be dissolved by adding an error correction code to the line information, then the total number of bits to be transferred for line set-up operation inevitably increases and a complex error correction code decoding circuit adapted to decode such error correction codes has to be incorporated so that consequently the overall circuit configuration will become bulky and too redundant.

SUMMARY OF THE INVENTION

In view of these technological problems, therefore, it is an object of the present invention to provide a line set-up system capable of solving the problems without increasing the number of bits required for line set-up operation to be transferred and the size of the error correction code decoding circuit and effectively preventing suspension of the burst signal transmission due to erroneous line set-up information.

In a line set-up system according to a aspect of the present invention, the line information detecting circuit detects N successive conformities in the line information from the network side line terminating set and, upon normally detecting such conformities in the line information, the information is transferred to the line set-up primary memory and stored therein.

Then a signal representing the result, normal or abnormal, of the operation of detecting N successive conformities is then transmitted to the network side line terminating set with an error correction code added thereto. The network side line set-up control circuit of the network side line terminating set checks if all the signals from the user's side line terminating sets show normal detection and, if yes, it generates a line set-up permission signal for the normal detection, whereas, if no, it generates a line set-up inhibition signal for the abnormal detection. The permission or inhibition signal is then transmitted to each user's side line terminating set with an error correction code added thereto.

Upon receiving the line set-up permission signal, the user's side line set-up control circuit of the user's side line terminating set allows the contents of the line set-up primary memory to be written into the line set-up main memory, whereas, upon receipt of the line set-up inhibition signal, it inhibits the contents of the line set-up primary memory from being written into the line set-up main memory.

Thus, the line set-up operation can be carried out without error due to any error on the part of the subscriber's line so that the configuration of the error correction code decoding circuit can be minimized. Additionally, since the line set-up for each user's side line terminating set is carried out by monitoring the result of the line set-up detection of the user's side line terminating set, the communication can be carried out by using the old line set-up information stored in the line set-up main memory even if the line information may not normally be received or it is not updated due to any error on the part of the subscriber's line.

Therefore, it is possible to prevent the transmission of burst signals from being suspended due to any error on the part of the line set-up information without increasing the number of bits to be transferred for the line set-up and the size of the error correction code decoding circuit.

Other objects and features will be clarified from the following description with reference to attached drawings.

DETAILED DESCRIPTION OF THE PREFERRED EMBODIMENTS

Figure 1:
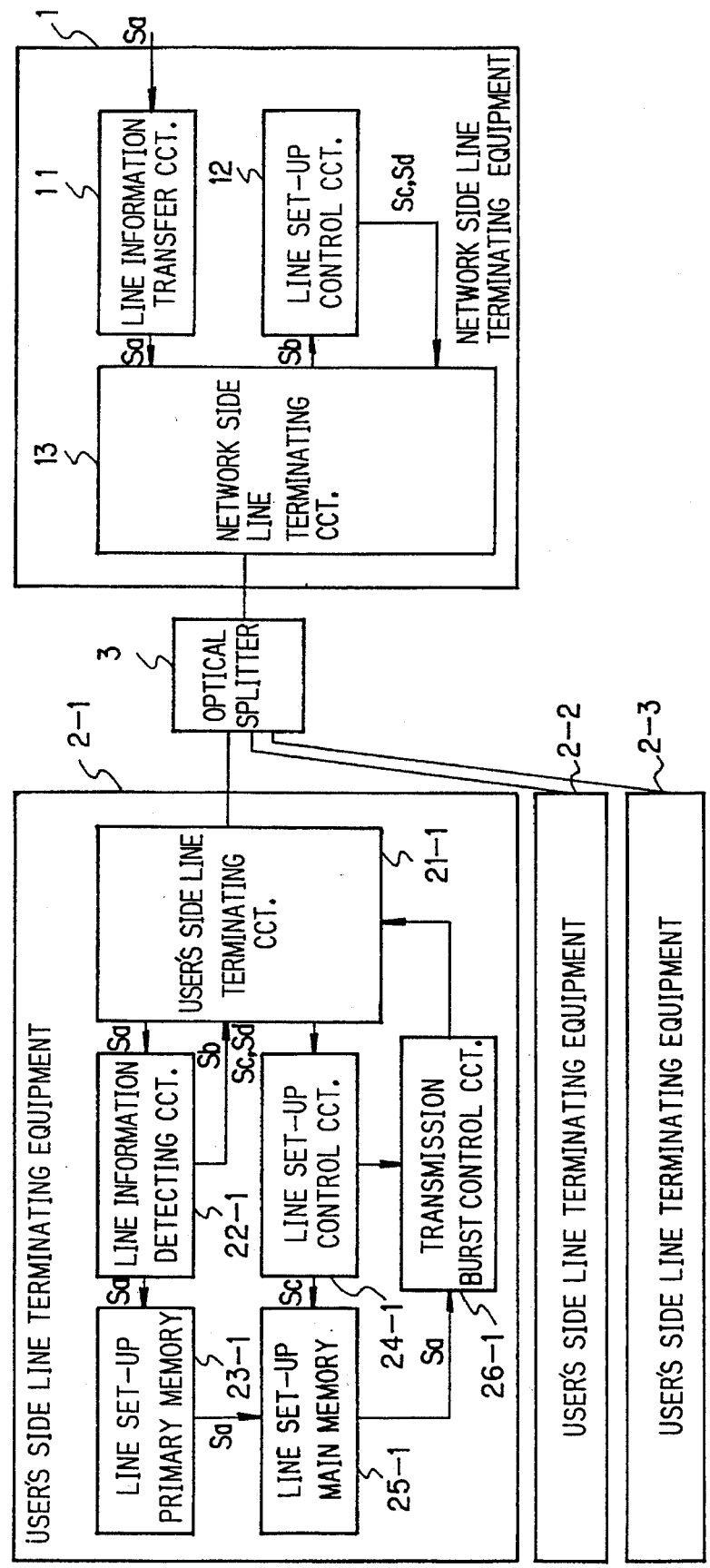
FIG. 1 is a block diagram showing an embodiment of a line set-up system according to the present invention.
Figure 2:
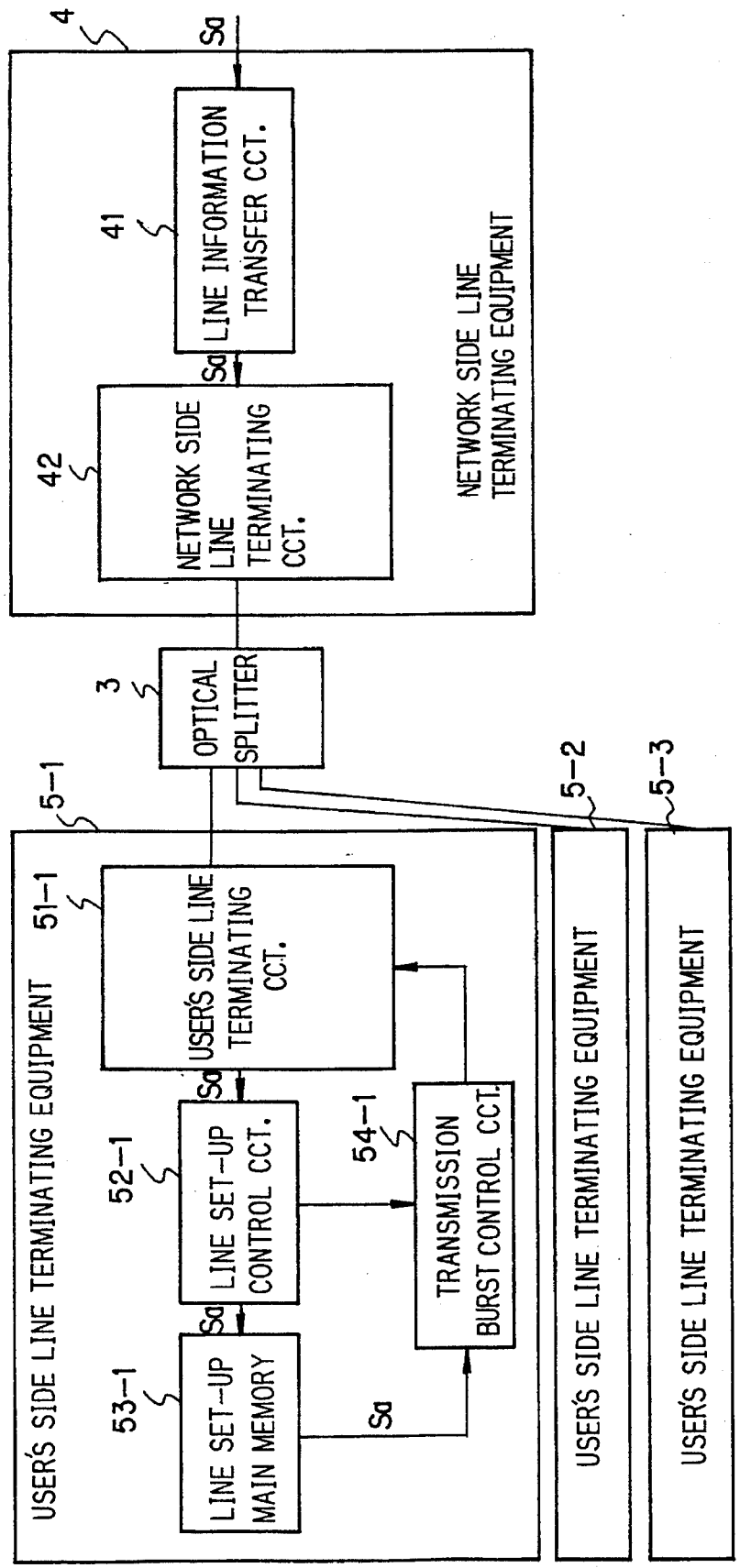
FIG. 2 is a block diagram showing the conventional line set-up system.

Referring to FIG. 1 illustrating a block diagram of a first embodiment of the present invention, there are shown a network side line terminating set 1 and a total of n user's side line terminating sets 2-i (i=1, 2, 3, . . . , n) connected to the line terminating 1 by way of an optical splitter 3 to show an n-branch star configuration.

The network side line terminating set 1 comprises a line information transfer circuit 11, a network side line set-up control circuit 12 and a network side line terminating circuit 13.

The line information transfer circuit 11 transfers externally supplied line information Sa on the phase of transmission and the burst length of transmission burst signals of each user's side line terminating set 2-i to the remaining user's side line terminating sets 2-i by way of the network side line terminating circuit 13. The network side line set-up control circuit 12 generates a line set-up permission signal Sc or a line set-up inhibition signal Sd on the basis of a detection result signal Sb representing the result of detecting N successive conformities from each user's side line terminating set 2-i extracted by the network side line terminating circuit 13 and sends it out to each user's side line terminating set 2-i by way of the network side line terminating circuit 13. The network side line terminating circuit 13 terminates n-branch optical lines and inserts the line information Sa and the line set-up permission signal Sc or the line set-up inhibition signal Sd into the transmission/reception burst signal.

On the other hand, each user's side line terminating set 2-i comprises a user's side line terminating circuit 21-i (only 21-1 is shown), a line information detection circuit 22-i (only 22-1 is shown), a line set-up primary memory 23-i (only 23-1 is shown), a user's side line set-up control circuit 24-i (only 24-1 is shown), a line set-up main memory 25-i (only 25-1 is shown) and a transmission burst control circuit 26-i (only 26-1 is shown).

The user's side line terminating circuit 21-i 'terminates the n-branch optical lines and executes the extraction of the line information Sa and the line control information and the insertion of the line set-up detection result signal Sb for the transmission/reception burst signal.

The line information detection circuit 22-i detects N successive conformities in the line information Sa from the user's side line terminating circuit 21-i and, if the result of the operation shows normal, the line information Sa is transferred to the line set-up primary memory 23-i and stored therein. The line information detection circuit 22-i also generates a signal Sb representing the normal or abnormal result of detecting N successive conformities and transmits it to the user's side line terminating circuit 21-i with an error correction code added thereto.

The line set-up primary memory 23-i stores the line information Sa transferred from the line information detection circuit 22-i and the line information Sa is transmitted to the line set-up main memory 25-i.

Upon receiving the line set-up permission signal Sc from the network side line terminating set 1, the user's side line set-up control circuit 24-i transmits a write control signal to the line set-up main memory 25-i to cause the contents of the line set-up primary memory 23-i to be written into the line set-up main memory 25-i. If, to the contrary, upon receipt of the line set-up inhibition signal Sd from the network side line terminating set 1, the user's side line set-up control circuit 24-i inhibits the writing of the contents of the line set-up main memory 23-i into the line set-up primary memory 25-i to keep the old information stored therein. If the user's side line set-up control circuit 24-i cannot receive the line set-up permission signal Sc nor the line set-up inhibition signal Sd from the network side line terminating set 1, a burst transmission stop signal is transmitted to the transmission burst control circuit 26-i to avoid any interference with the other user's side line terminating sets 2-i.

The line set-up main memory 25-i stores the line set-up information under the control of the user's side line set-up control circuit 24-i and transfers the contents stored therein to the transmission burst control circuit 26-i. The transmission burst control circuit 26-i controls the phase of transmission and the burst length of the transmission burst signal according to the information stored in the line set-up main memory 25-i.

Now, the operation of the above embodiment of the invention will be described by referring to FIG. 1. The line information Sa transferred from the line information transfer circuit 11 of the network side line terminating set 1 is inserted into the main signal by the network side line terminating circuit 13 and then sent out to each user's side line terminating set 2-i by way of the optical splitter 3.

Upon receiving the signal, from the network side line terminating set 1, the user's side line terminating circuit 21-i of the user's side line terminating set 2-i extracts the line information Sa and transmits the line information Sa to the line information detection circuit 22-i.

The line information detection circuit 22-i detects N successive conformities in the line information Sa from the user's side line terminating circuit 21-i and, if the line information Sa is normally detected, the line information Sa is transmitted to the line set-up primary memory 23-i and stored therein. The line information detection circuit 22-i generates the detection result signal Sb representing the positive or negative result of the operation of detecting N successive conformities and transmits it to the user's side line terminating circuit 21-i with an error correction code added thereto.

The user's side line terminating circuit 21-i inserts the signal Sb from the line information detection circuit 22-i into the main signal and sends out the inserted signal to the network side line terminating set 1.

Upon receiving the signal Sb extracted by the network side line terminating circuit 13, the network side line set-up circuit 12 of the network side line terminating set 1 decodes the error correction code added to the signal Sb and determines if all the signals SD shows normal detection operation.

If all the signals Sb from the user's side line terminating sets 2-i show the normal detection result, the network side line set-up control circuit 12 generates the line set-up permission signal Sc and transmits it to the network side line terminating circuit 13 with an error correction code added thereto. If, on the other hand, it is determined that not all the signals Sb from the user's side line terminating sets 2-i show the positive result, the network side line set-up control circuit 12 generates the line set-up inhibition signal Sd and transmits it to the network side line terminating circuit 13 with an error correction code added thereto.

The network side line terminating circuit 13 inserts the line set-up permission signal Sc or the line set-up inhibition signal Sd generated by the network side line set-up control circuit 12 into the main signal and sends it out to each user's side line terminating set 2-i.

Upon receiving the line set-up permission signal Sc or a line set-up inhibition signal Sd transmitted from the network side the line terminating set 1 and extracted by the user's side line terminating circuit 21-i, the user's side line set-up control circuit 24-i decodes the error correction code of the line set-up permission signal Sc or that of the line set-up inhibition signal Sd and determines if it received the line set-up permission signal Sc or the line set-up inhibition signal Sd from the network side line terminating set 1. If it is determined by the user's side line set-up control circuit 24-i that it received the line set-up permission signal Sc from the network side line terminating set 1, a write control signal is transmitted to the line set-up main memory 25-i and the contents of the line set-up primary memory 23-i and stored in the memory 25-i. If, on the other hand, it is determined by the user's side line set-up control circuit 24-i that it received the line set-up inhibition signal Sd, it inhibits the line set-up main memory 25-i from storing the contents of the line set-up primary memory 23-i, thereby keeping the old value therein.

If the user's side line set-up control circuit 24-i receives neither the line set-up permission signal Sc nor the line set-up inhibition signal Sd from the network side line terminating set 1, a burst transmission stop signal is transmitted to the transmission burst control circuit 26-i to avoid any interference with the other user's side line terminating sets 2-i.

The transmission burst control circuit 26-i controls the phase of transmission and the burst length of the transmission burst signal according to the information stored in the line set-up main memory 25-i and, upon receiving the stop control signal from the user's side line set-up control circuit 24-i, stops the transmission of burst signals.

Thus, with the above operation of detecting N successive conformities in the line information Sa from the network side line terminating set 1 by the line information detection circuit 22-i of the user's side line terminating 2-i, upon detection of N successive conformities in the line information Sa, the line information Sa is transmitted to the line set-up primary memory 23-i for being stored therein, and the signal Sb representing the normal or abnormal detection of N successive conformities is transmitted to the network side line terminating set 1 with an error correction code added thereto. On the other hand, the line set-up permission signal Sc, if the network side line set-up control circuit 12 of the network side line terminating set 1 determines that all the signals Sb from the user's side line terminating sets 2-i are normal, or the line set-up inhibition signal Sd, if the network side line set-up control circuit determines that not all the signals Sb from the user's side line terminating sets 2-i are normal, is transmitted to each user's side line terminating set 2-i with an error correction code added thereto. The contents of the line set-up primary memory 23-i into the line set-up main memory 25-i if the line set-up permission signal Sc from the network side line terminating set 1 is received by the user's side line set-up control circuit 24-i and the writing of the contents of the line set-up primary memory 23-i into the line set-up main memory 25-i is inhibited if the line set-up inhibition signal Sd is received by the user's side line set-up control circuit 24-i. According to the above operation, the line can be set up without any error on the part of the line so that the overall configuration of the error correction code decoding circuit can be minimized.

Additionally, since the line set-up detection result on the part of the user's side line terminating set 2-i is monitored by the network side line terminating set 1, the communication can be continued based on the line set-up information stored in the line set-up main memory 25-i even if the information Sa is not normally received or not updated due to any error on the part of the subscriber's line.

Thus, without increasing the number of bits required for the operation of line set-up and the size of the error correction code decoding circuit, suspension of burst signal transmission due to any error on the part of the line set-up information can be effectively prevented.

In the system described above in detail, if the line information is determined to be normal, the line information transmitted from the network side line terminating set is stored. The line information detection result signal with the error correction code added thereto is transmitted to the network side line terminating set. Either the line set-up permission signal or the line set-up inhibition signal is generated depending on the line information detection result signal from each of the user's side line terminating sets. The contents of the memory means is updated by the line information stored in the storing means when the line set-up permission signal is generated, whereas the line information stored by the storing means is inhibited from being written into the memory means when the line set-up inhibition means is generated. Thereby, without increasing the number of bits required for the line set-up and the size of the error correction code decoding circuit, suspension of burst signal transmission due to any error on the part of the line set-up information can be effectively prevented.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A line set-up system wherein a network side line terminating set is connected to a total of n (n=positive integer) user's side line terminating sets to form an n-branch star configuration comprising:

transfer means provided in said network side line terminating set for transferring at least line information concerning a phase of transmission of transmission burst signals to each of said n user's side line terminating sets;

memory means provided in each of said n user's side line terminating sets for storing said line information to control at least the phase of transmission of said transmission burst signals;

storing means provided in each of said n user's side line terminating sets for storing said line information from said transfer means;

determination means provided in each of said n user's side line terminating sets for determining if said line information from said transfer means is normal or not;

write-in means provided in each of said n user's side line terminating sets for writing said line information into said storing means when said determination determines it to be normal;

transmission means provided in each of said n user's side line terminating sets for transmitting a detection result signal representing the result of detection of the line information formed by adding an error correction code to the determined result of said determination means to said network side line terminating set;

output means provided in said network side line terminating set for generating either a line set-up permission signal directing update of the line information or a line set-up inhibition signal inhibiting update of the line information depending on the signal representing the result of detection of line information from the transmission means of all the n user's side line terminating sets;

update means provided in each of said n user's side line terminating sets for updating the contents of said memory means by the line information stored in said storing means when the line set-up permission signal is generated by said output means; and write-in inhibition means provided in each of said n user's side line terminating sets for inhibiting said line information stored in said storing means from being written into said memory means when the line set-up inhibition signal is produced by said output means.

2. A line set-up system according to claim 1, wherein said determination means determines that said line information from said transfer means is normal when N (n=positive integer) successive conformities are detected.

3. A line set-up system according to claim 1, wherein said output means adds an error correction code to said line set-up permission signal or said line set-up inhibition signal before sending it out.

4. A line set-up system according to claim 1, wherein said output means produces a line set-up inhibition signal when any of the signals representing the result of detection of line information from the n user's side line terminating sets is abnormal.

5. A line set-up system according to claim 1, wherein said output means produces a line set-up permission signal when all the signals representing the result of detection of line information from the n user's side line terminating sets is normal.

6. A line set-up system according to claim 1, further comprising means provided in each of said n user's side line terminating sets for suspending the transmission of transmission burst signals when said output means sends out neither a line set-up permission signal nor a line set-up inhibition signal within a predetermined period of time.

7. A line set-up system according to claim 2, wherein said output means adds an error correction code to said line set-up permission signal or said line set-up inhibition signal before sending it out.

8. A line set-uD system according to claim 2, wherein said output means produces a line set-up inhibition signal when any of the signals representing the result of detection of line information from the n user's side line terminating sets is abnormal.

9. A line set-up system according to claim 3, wherein said output means produces a line set-up inhibition signal when any of the signals representing the result of detection of line information from the n user's side line terminating sets is abnormal.

10. A line set-up system according to claim 2, wherein said output means produces a line set-up permission signal when all the signals representing the result of detection of line information from the n user's side line terminating sets is normal.

11. A line set-up system according to claim 3, wherein said output means produces a line set-up permission signal when all the signals representing the result of detection of line information from the n user's side line terminating sets is normal.

12. A line set-up system according to claim 4, wherein said output means produces a line set-up permission signal when all the signals representing the result of detection of line information from the n user's side line terminating sets is normal.

13. A line set-up system according to claim 2, further comprising means provided in each of said n user's side line terminating sets for suspending the transmission of transmission burst signals when said output means sends out neither a line set-up permission signal nor a line set-up inhibition signal within a predetermined period of time.

14. A line set-up system according to claim 3, further comprising means provided in each of said n user's side line terminating sets for suspending the transmission of transmission burst signals when said output means sends out neither a line set-up permission signal nor a line set-up inhibition signal within a predetermined period of time.

15. A line set-up system according to claim 4, further comprising means provided in each of said n user's side line terminating sets for suspending the transmission of transmission burst signals when said output means sends out neither a line set-up permission signal nor a line set-up inhibition signal within a predetermined period of time.

16. A line set-up system according to claim 5, further comprising means provided in each of said n user's side line terminating sets for suspending the transmission of transmission burst signals when said output means sends out neither a line set-up permission signal nor a line set-up inhibition signal within a predetermined period of time.

17. A line set-up system according to claim 7, further comprising means provided in each of said n user's side line terminating sets for suspending the transmission of transmission burst signals when said output means sends out neither a line set-up permission signal nor a line set-up inhibition signal within a predetermined period of time.

18. A line set-up system according to claim 8, further comprising means provided in each of said n user's side line terminating sets for suspending the transmission of transmission burst signals when said output means sends out neither a line set-up permission signal nor a line set-up inhibition signal within a predetermined period of time.

19. A line set-up system having a network side line terminating set and a total of n user's side line terminating sets connected to a line terminating in the form of an n-branch star configuration comprising steps of:

detecting N successive conformities in line information from the network side line terminating set and, upon normally detecting such conformities in the line information, transferring the detection information to a line set-up primary memory to be stored therein;

transmitting a detection signal representing the result, normal or abnormal, of the operation of detecting N successive conformities to the network side line terminating set with an error correction code added thereto;

checking whether all the detection signals from the user's side line terminating sets show normal detection;

generating a line set-up permission signal if they show the normal detection, and a line set-up inhibition signal if they show the abnormal detection;

transmitting the permission or inhibition signal to each user's side line terminating set with an error correction code added thereto;

upon receiving the line set-up permission signal, allowing the contents of a line set-up primary memory to be written into a line set-up main memory by the user's side line set-up control circuit of the user's side line terminating set, whereas, upon receipt of the line set-up inhibition signal, inhibiting the contents of the line set-up primary memory from being written into the line set-up main memory.

20. A line set-up system having a network side line terminating set and a total of n user's side line terminating sets connected to the line terminating in the form of an n-branch star configuration comprising:

> line set-up detection means for detecting N successive conformities in line information from the network side line terminating set and transmitting a detection signal representing the result of detecting N successive conformities with an error correction code added thereto to the network side line terminating set;
>
> network side line set-up control circuit for generating a line set-up permission signal or a line set-up inhibition signal on the basis of the detection signals from all user's side line terminating sets and transmitting it to each of the user's side line terminating sets;
>
> line set-up primary memory for storing the line information;
>
> user's side line set-up control means for writing the contents of line set-up primary memory into a line set-up main memory in response to the line set-up permission signal and inhibiting the contents of the line set-up primary memory from being written into the line set-up main memory in response to the line set-up inhibition signal.

* * * * *